(12) United States Patent
Shim et al.

(10) Patent No.: US 11,289,971 B2
(45) Date of Patent: Mar. 29, 2022

(54) MOTOR BRAKE DEVICE, ELECTRONIC DEVICE USING SAME AND CONTROL METHOD

(71) Applicant: Samsung Electronics Co., Ltd., Gyeonggi-do (KR)

(72) Inventors: Jaekyu Shim, Gyeonggi-do (KR); Sungjin Park, Gyeonggi-do (KR); Woojong Cho, Gyeonggi-do (KR); Heeseung Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 16/478,578

(22) PCT Filed: Jan. 8, 2018

(86) PCT No.: PCT/KR2018/000334
§ 371 (c)(1),
(2) Date: Jul. 17, 2019

(87) PCT Pub. No.: WO2018/151413
PCT Pub. Date: Aug. 23, 2018

(65) Prior Publication Data
US 2019/0348890 A1     Nov. 14, 2019

(30) Foreign Application Priority Data
Feb. 20, 2017   (KR) .......................... 10-2017-0022148

(51) Int. Cl.
*H02K 7/102*     (2006.01)
*F16K 31/04*     (2006.01)
*H02P 3/06*      (2006.01)

(52) U.S. Cl.
CPC ........... *H02K 7/102* (2013.01); *F16K 31/042* (2013.01); *H02P 3/06* (2013.01)

(58) Field of Classification Search
CPC .............................. H02K 7/02; H02K 49/046
USPC ............................................ 310/75 R, 76, 77
See application file for complete search history.

(56) References Cited

U.S. PATENT DOCUMENTS

| 7,063,190 | B1 * | 6/2006 | Sylvan ................. F16D 65/186 188/161 |
| 2009/0284105 | A1 | 11/2009 | Miyashita et al. |
| 2010/0301785 | A1 * | 12/2010 | Davis ..................... B60T 13/04 318/365 |

FOREIGN PATENT DOCUMENTS

| JP | 59117456 A | * 7/1984 | ............ F16D 65/78 |
| JP | 01-303047 A | 12/1989 | |
| JP | 01303047 A | * 12/1989 | |
| JP | 2008051093 A | * 3/2008 | |
| JP | 2010121613 A | * 6/2010 | |
| JP | 2010-226922 A | 10/2010 | |
| JP | 2010-279242 A | 12/2010 | |
| JP | 2015-008593 A | 1/2015 | |

(Continued)

*Primary Examiner* — Jose A Gonzalez Quinones
(74) *Attorney, Agent, or Firm* — Cha & Reiter, LLC.

(57) ABSTRACT

Disclosed is a motor brake device comprising: a solenoid module disposed along the circumferential outer peripheral surface of an outer rotor-type motor; a first friction member coupled to one surface of a motor rotor along the direction of a rotary shaft of a motor; and a second friction member disposed along the outer peripheral surface of the rotor, and selectively coming in contact with or being spaced from the first friction member by the solenoid module.

14 Claims, 11 Drawing Sheets

(56) References Cited

FOREIGN PATENT DOCUMENTS

| KR | 10-2009-0104731 A    |   | 10/2009 |
|----|----------------------|---|---------|
| KR | 10-1330068 B1        |   | 11/2013 |
| KR | 101330068 B1         | * | 11/2013 |
| KR | 10-1425882 B1        |   | 8/2014  |
| KR | 10-2016-0077411 A    |   | 7/2016  |

* cited by examiner

MOTOR BRAKE DEVICE, ELECTRONIC DEVICE USING SAME AND CONTROL METHOD

CROSS REFERENCE TO RELATED APPLICATIONS

This application is a National Phase Entry of PCT International Application No. PCT/KR2018/000334, which was filed on Jan. 8, 2018, and claims a priority to Korean Patent Application No. 10-2017-0022148, which was filed on Feb. 20, 2017, the contents of which are incorporated herein by reference.

TECHNICAL FIELD

An embodiment of the disclosure relates to a brake device for controlling the driving of a motor.

BACKGROUND ART

A motor device is used which includes a brake device for preventing a rotor of a motor from being rotated by an external force in a state where no current is applied to the motor. The braking device may be stacked and arranged in the direction of a rotation axis of the motor.

DISCLOSURE OF INVENTION

Technical Problem

When the motor brake device is stacked in the direction of the rotation axis of the motor, the overall length and size may become larger and the degree of freedom of product design may be lowered.

Various embodiments of the disclosure may provide a motor brake device disposed in a circumferential direction of a motor in order to minimize an increase of the overall length of the motor and the motor brake device as compared with the motor only.

Various embodiments of the disclosure may provide a control method of a motor brake device capable of minimizing noise caused when the motor brake device operates or stops.

Solution to Problem

According to an embodiment of the disclosure, a motor brake device may include a solenoid module disposed along a circumferential-direction outer peripheral surface of a motor; a first friction member combined with one surface of a rotor of the motor in a direction of a rotation axis of the motor; and a second friction member disposed along an outer peripheral surface of the rotor, moving by the solenoid module in the direction of the rotation axis of the motor by using the rotor as a movement axis, and thereby being in contact with or separated from the first friction member.

According to another embodiment of the disclosure, an electronic device may include a motor; a solenoid module disposed along a circumferential-direction outer peripheral surface of the motor; a brake module operated by the solenoid module, disposed on one side of the motor in an axis direction, and restricting or permitting a rotation of a rotor; and a processor electrically connected to the motor and the solenoid module.

According to still another embodiment of the disclosure, a control method of a motor brake device including a processor configured to detect an input of a driving signal or a stop signal for a motor and thereby to control supplying a current to a solenoid module and the motor may include operations of detecting the input of the driving signal; supplying the current to the solenoid module; and supplying the current to the motor.

Advantageous Effects of Invention

According to various embodiments of the disclosure, the motor brake device can minimize the increase in the overall length of the motor and the motor brake device while maintaining the anti-rotation effect of the motor.

According to various embodiments of the disclosure, the control method of the motor brake device can minimize noise caused when the motor brake device operates or stops.

MODE FOR THE INVENTION

Hereinafter, various embodiments of the disclosure are described in detail with reference to accompanying drawings. The embodiments and terms used herein are not intended to limit the technology disclosed in specific forms and should be understood to include various modifications, equivalents, and/or alternatives to corresponding embodiments. In the drawings, similar reference numbers are used to indicate similar constituent elements. As used herein, singular forms are intended to include the plural forms as well, unless the context clearly indicates otherwise. In the disclosure, the expression "A or B" or "at least one of A and/or B" is intended to include any possible combination of enumerated items. In the present disclosure, expressions such as "1st" or "first", "2nd" or "second", etc. may modify various components regardless of the order and/or the importance but do not limit corresponding components. When it is mentioned that a certain (first) component is "(functionally or communicatively) connected" to or "accessed" by another (second) component, it may be understood that the component is directly connected to or accessed by the other component or that still other (third) component is interposed between the two components.

In the disclosure, the expression "configured to ~" may be interchangeably used with other expressions "suitable for ~", "having the capacity to ~", "designed to ~", "adapted to ~", "made to ~", or "capable of ~". The expression "configured to (or set to) ~" may not necessarily mean "specifically designed to ~" in hardware. Instead, in some situations, the expression a device "configured to ~" may mean that the device is "capable of ~" with other devices or components. For example, a "processor configured to (or set to) perform A, B, and C" may mean a dedicated processor (e.g., an embedded processor) for performing a corresponding operation or a general-purpose processor (e.g., a central processing unit (CPU) or an application processor (AP)) which executes corresponding operations by executing one or more software programs which are stored in a memory device.

Figure 1:
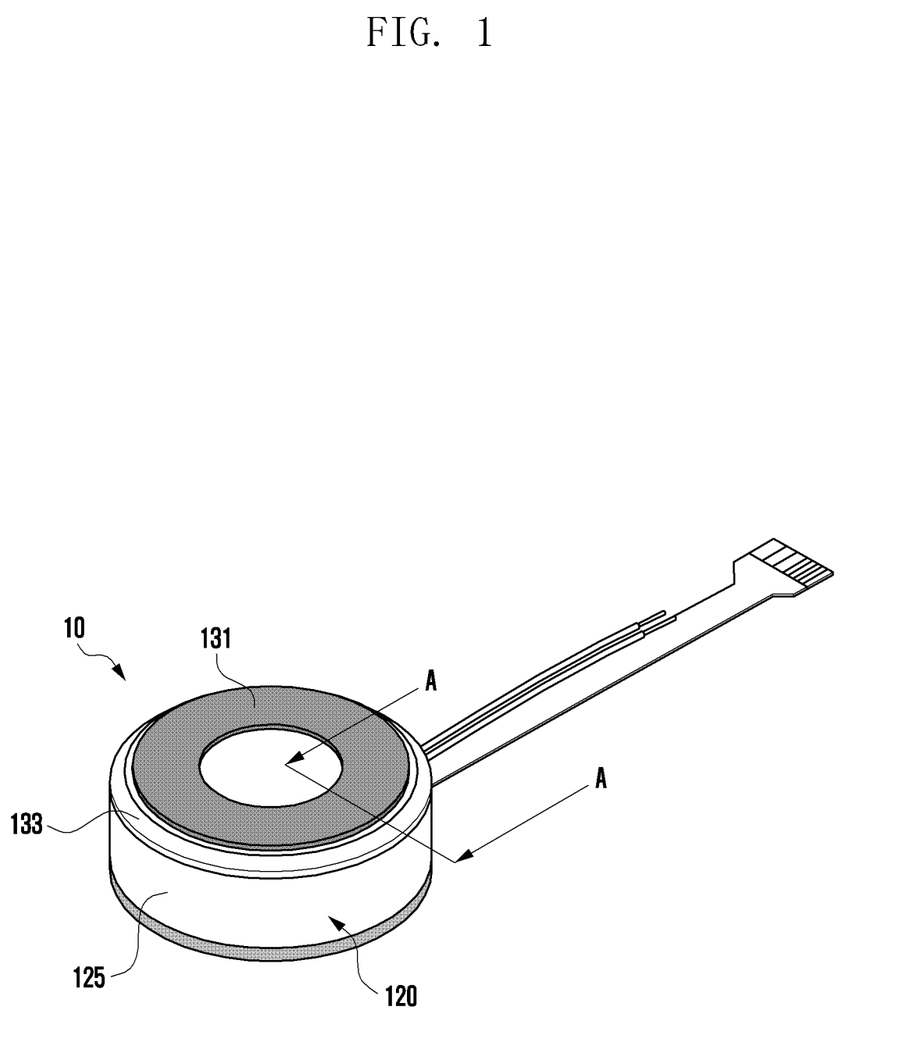
FIG. 1 is a perspective view of a motor brake device according to an embodiment of the disclosure.

FIG. 1 is a perspective view of a motor brake device 10 according to an embodiment of the disclosure.

Shown is a state in which the motor brake device 10 according to an embodiment of the disclosure is combined with the motor 100.

The motors may be classified into an inner-rotor type motor in which a rod-shaped shaft rotates, and an out-rotor type motor in which a motor housing rotates around a rod-shaped shaft. The motor brake device 10 according to an embodiment of the disclosure may be applied to various types of motors including the above two types of motors. Hereinafter, in order to facilitate understanding of the disclosure, the out-rotor type motor 100 (see FIG. 2) will be described for example. In describing the motor brake device 10 according to various embodiments of the disclosure, 'length' may refer to the length in an axial direction with respect to a rotation axis of the motor 100 (see FIG. 2).

Figure 2:
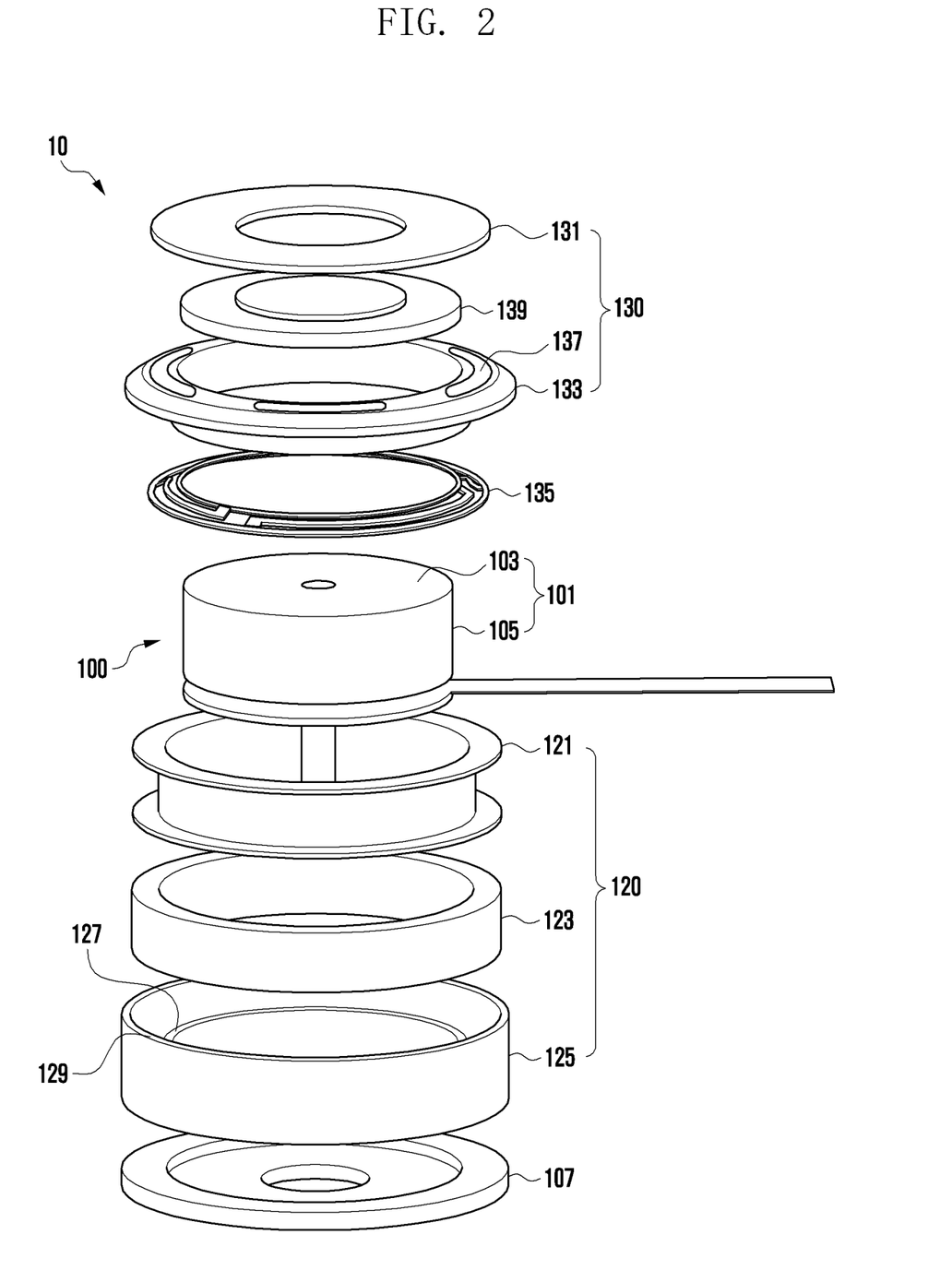
FIG. 2 is an exploded view of a motor brake device according to an embodiment of the disclosure.

FIG. 2 is an exploded view of a motor brake device 10 according to an embodiment of the disclosure.

The motor brake device 10 according to an embodiment of the disclosure may include a solenoid module 120, a first friction member 131, and a second friction member 133. The solenoid module 120 may be disposed along a circumferential-direction outer peripheral surface 105 of the motor 100. This prevents the length of the motor brake device from being increased by the length of the solenoid module 120 as compared with a case where the solenoid module 120 is disposed in a direction of a rotation axis of the motor 100.

The first friction member 131 may be stacked on one surface 103 of a rotor 101 in the direction of the rotation axis of the motor 100. The second friction member 133 may be disposed along the outer peripheral surface 105 of the rotor 101 and operated by the solenoid module 120. A frictional force generated by contact between the first friction member 131 and the second friction member 133 may prevent the rotor 101 of the motor 100 from being rotated.

The motor brake device 10 according to an embodiment of the disclosure may include a brake module 130 or the solenoid module 120.

The motor brake device 10 shown in FIG. 2 may have a form of combining the brake module 130 with the motor 100. The brake module 130 may include the first friction member 131, the second friction member 133, an elastic member 135, a third friction member 137, and a rotor pad 139.

The first friction member 131 may be formed of a material having a friction coefficient higher than that of the rotor 101 and thereby generating a large frictional force. The first friction member 131 is not limited to a continuous ring shape as shown in FIG. 2, and may have a shape of being intermittently arranged within a certain radius around the rotation axis of the motor 100.

The rotor pad 139 may perform a function of combining the first friction member 131 with the rotor 101 of the motor 100. A thickness of the rotor pad 139 may be adjusted to adjust a gap between the first friction member 131 and the second friction member 133.

The second friction member 133 may be disposed along the outer peripheral surface 105 of the rotor 101 and have an inner diameter greater than a diameter of the rotor 101, thereby performing a reciprocating motion in the direction of the rotation axis of the motor 100 by using the rotor 101 as a movement axis. When the second friction member 133 moves and then comes into contact with the first friction member 131, a frictional force generated at a contact surface may prevent the rotation of the rotor 101.

The elastic member 135 may be disposed along the outer peripheral surface 105 of the rotor 101 and move the second friction member 133 toward the first friction member 131. The elastic member 135 may press the second friction member 133 toward the first friction member 131, thereby providing a normal force for generating a frictional force. In addition, the elastic member 135 may connect the second friction member 133 and a yoke 125 (to be described below) of the solenoid module 120 to make it impossible to rotate each other.

The elastic member 135 may be disposed in the form of a ring-shaped spring as shown in FIG. 2. However, this is exemplary only. The elastic member 135 may be formed of various materials and shapes as long as it can press the second friction member 133 toward the first friction member 131.

The third friction member 137 may be disposed on a surface of the second friction member 133 being in contact with the first friction member 131, thereby performing a function of increasing a frictional force generated between the first friction member 131 and the second friction member 133. Specifically, the third friction member 137 may be formed of a material having a friction coefficient higher than that of the second friction member 133. The third friction member 137 may be disposed in a sticker-type adhesive form or in a coatable form.

The solenoid module 120 may include a bobbin 121, a solenoid coil 123, and a yoke 125.

The bobbin 121 may be formed to have an inner diameter greater than the diameter of the rotor 101 and allow the solenoid coil 123 to be fixedly positioned along the outer peripheral surface 105 of the rotor 101 without contacting the rotor 101. In addition, the bobbin 121 may serve as a support for the elastic member 135 to press the second friction member 133 toward the first friction member 131.

The solenoid coil 123 may generate an electromagnetic force in a direction in which the second friction member 133 is separated from the first friction member 131 when a current is supplied to the coil 123. Although the solenoid coil 123 is described as a form being wound around the bobbin 121 in an embodiment, this is exemplary only. The solenoid coil 123 may have any form capable of generating an electromagnetic force in a direction in which the second friction member 133 is separated from the first friction member 131. For example, the solenoid coil 123 may be a plurality of small solenoid coils disposed along the circumferential direction of the bobbin 121.

The yoke 125 may prevent the solenoid coil 123 from being exposed. In addition, the yoke 125 may perform a function of restricting movement ranges of the first friction member 131 and the second friction member 133. Details will be described later with reference to FIG. 4.

A bracket 107 may provide a space in which the motor 100 and the motor brake device 10 are placed, and also perform a function of facilitating attachment to other devices.

Figure 3:
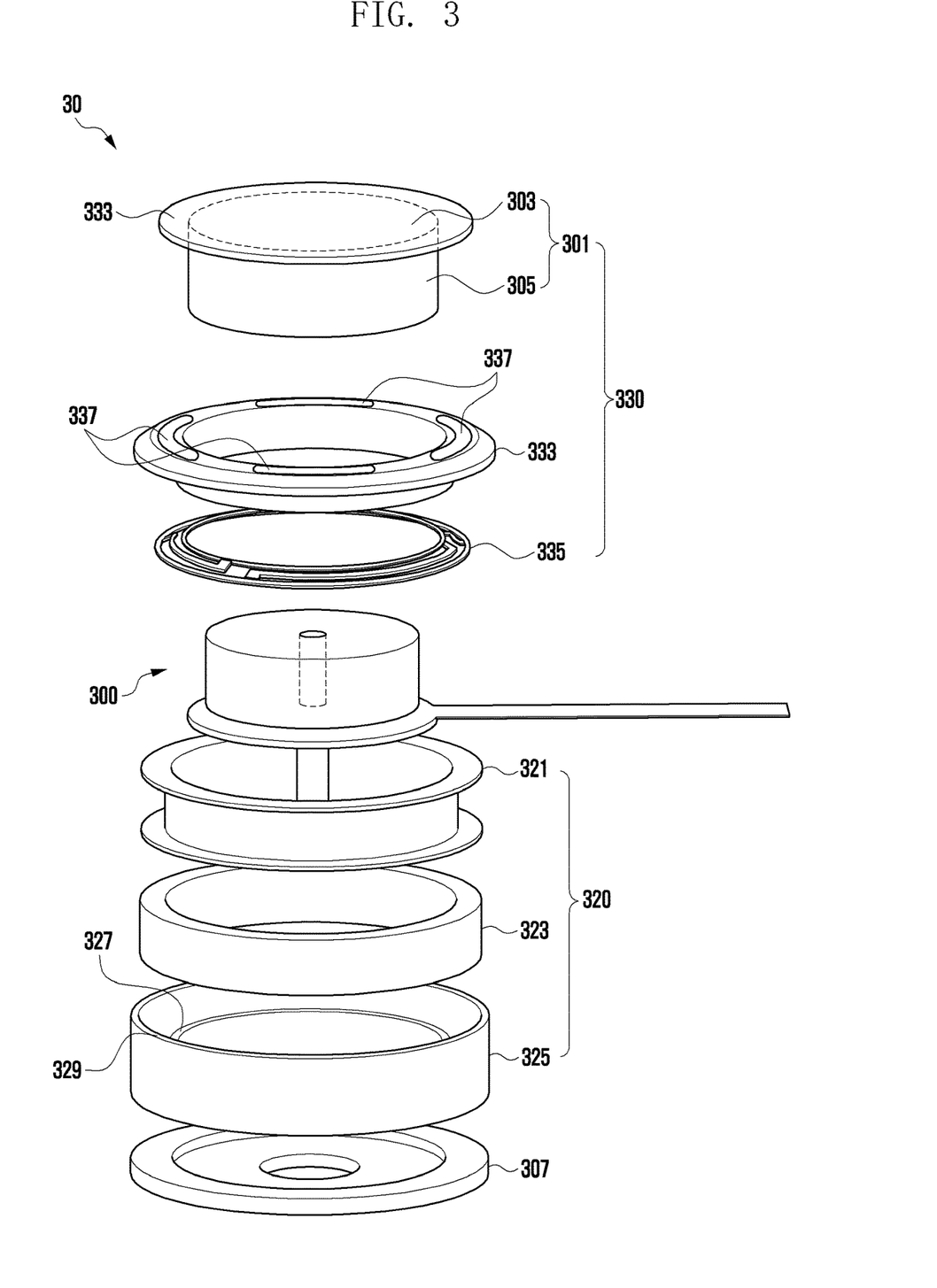
FIG. 3 is an exploded view of a motor brake device according to another embodiment of the disclosure.

FIG. 3 is an exploded view of a motor brake device 30 according to another embodiment of the disclosure.

The motor brake device 30 according to another embodiment may include a brake module 330 and a solenoid module 320.

The motor brake device 30 shown in FIG. 3 may have a form in which the brake module 330 is produced integrally with a rotor 301 of a motor 300.

Specifically, the first friction member (131, see FIG. 2) may be formed integrally with the rotor (101, see FIG. 2) of the motor (100, see FIG. 2). That is, one side of the rotor (101, see FIG. 2) may be extended in a radial direction to form the first friction member (131, see FIG. 2). Hereinafter, in describing the motor brake device 30 according to another embodiment, the first friction member 331 produced integrally with the rotor 301 of the motor 300 will be referred to as a friction portion 331.

The brake module 330 may include the friction portion 331, a second friction member 333, an elastic member 335, and a third friction member 337.

The friction portion 331 is not limited to a ring shape as shown in FIG. 3, and may have a shape of being intermittently arranged within a certain radius around the rotation axis of the motor 300.

The second friction member 333 may be disposed along an outer peripheral surface 305 of the rotor 301 and have an inner diameter greater than a diameter of the rotor 301, thereby performing a reciprocating motion in the direction of the rotation axis of the motor 300 by using the rotor 301 as a movement axis. When the second friction member 333 moves and then comes into contact with the friction portion 331, a frictional force generated at a contact surface may prevent the rotation of the rotor 301.

The elastic member 335 may be disposed along the outer peripheral surface 305 of the rotor 301 and move the second friction member 333 toward the friction portion 331. The elastic member 335 may press the second friction member 333 toward the friction portion 331, thereby providing a normal force for generating a frictional force. In addition, the elastic member 335 may connect the second friction member 333 and a yoke 325 (as described above) of the solenoid module 320 to make it impossible to rotate each other. The elastic member 335 may be disposed in the form of a ring-shaped spring as shown in FIG. 3. However, this is exemplary only. The elastic member 335 may be formed of various materials and shapes as long as it can press the second friction member 333 toward the friction portion 331.

The third friction member 337 may be disposed on a surface of the second friction member 333 being in contact with the friction portion 331, thereby performing a function of increasing a frictional force generated between the friction portion 331 and the second friction member 333. Specifically, the third friction member 337 may be formed of a material having a friction coefficient higher than that of the second friction member 333. The third friction member 337 may be disposed in a sticker-type adhesive form or in a coatable form.

The solenoid module 320 may include a bobbin 321, a solenoid coil 323, and a yoke 325.

The bobbin 321 may be formed to have an inner diameter greater than the diameter of the rotor 301 and allow the solenoid coil 323 to be positioned along the outer peripheral surface 305 of the rotor 301 without contacting the rotor 301. In addition, the bobbin 321 may serve as a support for the elastic member 335 to press the second friction member 333 toward the friction portion 331.

The solenoid coil 323 may generate an electromagnetic force in a direction in which the second friction member 333 is separated from the friction portion 331 when a current is supplied to the coil 323. Although the solenoid coil 323 is described as a form being wound around the bobbin 321 in another embodiment, this is exemplary only. The solenoid coil 323 may have any form capable of generating an electromagnetic force in a direction in which the second friction member 333 is separated from the friction portion 331. For example, the solenoid coil 323 may be a plurality of small solenoid coils disposed along the circumferential direction of the bobbin 321.

The yoke 325 may prevent the solenoid coil 323 from being exposed. In addition, the yoke 325 may perform a function of restricting movement ranges of the friction portion 331 and the second friction member 333. Details will be described later with reference to FIG. 4.

A bracket 307 may provide a space in which the motor 300 and the motor brake device 30 are placed, and also perform a function of facilitating attachment to other devices.

Figure 4:
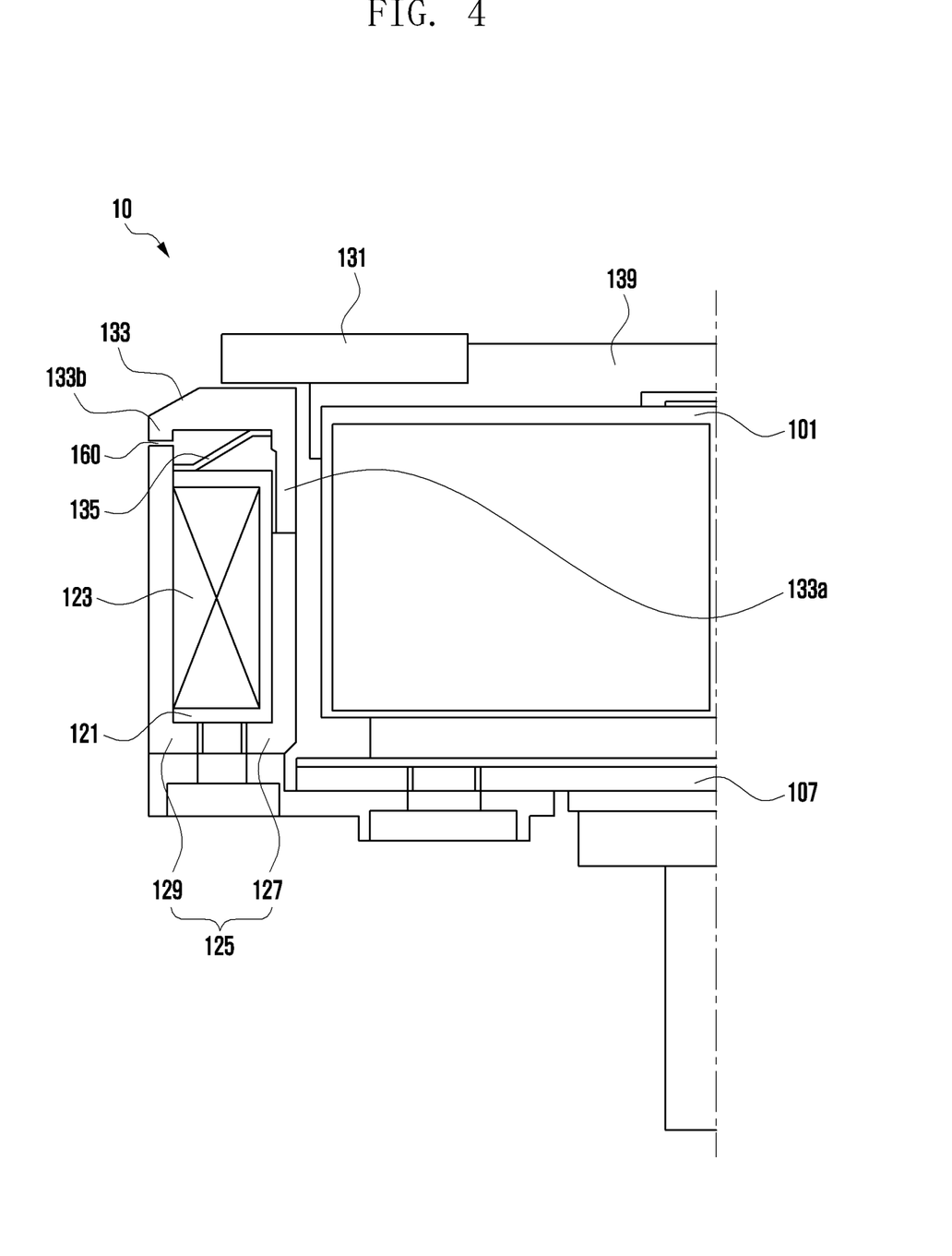
FIG. 4 is a cross-sectional view taken along the line A-A in FIG. 1.

FIG. 4 is a cross-sectional view taken along the line A-A in FIG. 1.

The yoke 125 may be composed of an inner ring 127 and an outer ring 129. The inner ring 127 may make the bobbin 121 to be spaced apart from the rotor 101 and come into contact with one end portion 133*a* of the second friction member 133 to restrict a movement radius. The outer ring 129 may prevent the solenoid coil 123 from being exposed.

The length of the inner ring 127 may be smaller than the length of the outer ring 129. A part may be required for guiding a smooth movement of the second friction member 133 in the direction of the rotation axis of the motor 100 along the outer peripheral surface 305 of the rotor 101. The one end portion 133*a* of the second friction member 133 is formed to have a certain length, thus guiding the movement of the second friction member 133 along an inner peripheral surface of the bobbin 121. Because the inner ring 127 of the yoke is formed to be shorter than the outer ring 129, it is possible to absorb the length of the one end portion of the second friction member 133. This may prevent the motor 100 and the motor brake device 10 from being increased in the overall length.

A certain gap 160 may be formed between the other end portion 133*b* of the second friction member 133 and the outer ring 129 of the yoke. It is difficult to make the sum of the length of the one end portion 133*a* of the second friction member 133 and the length of the inner ring 127 to be equal to the sum of the length of the other end portion 133*b* and the length of the outer ring 129. Thus, the gap 160 may absorb the tolerance that occurs in a manufacturing process.

Now, an operation principle of the motor brake device 10 according to an embodiment of the disclosure will be described with reference to FIG. 4. Using the bobbin 121 as a support, the elastic member 135 may press the second friction member 133 toward the first friction member 131. Then, a frictional force may be generated between the first friction member 131 and the second friction member 133, based on an elastic force applied as a normal force, and the frictional force may prevent the rotor 101 of the motor 100 from being rotated.

The magnitude of the frictional force may be set to a degree for preventing the rotation of the rotor 101 which is caused by the load of a target object to be rotated in connection with the rotor 101. Alternatively, it may be set to such a degree as to enable the rotation of the rotor 101 when the user intends to rotate the rotor 101 by applying an external force by hand.

When the current is supplied to the motor 100 for rotation, the current may be supplied to the solenoid coil 123 as well. When the solenoid coil 123 is supplied with the current, it may pull the second friction member 133 to be separated from the first friction member 131. Therefore, the frictional force between the first friction member 131 and the second friction member 133 disappears, so that the motor 100 can smoothly rotate.

Figure 5:
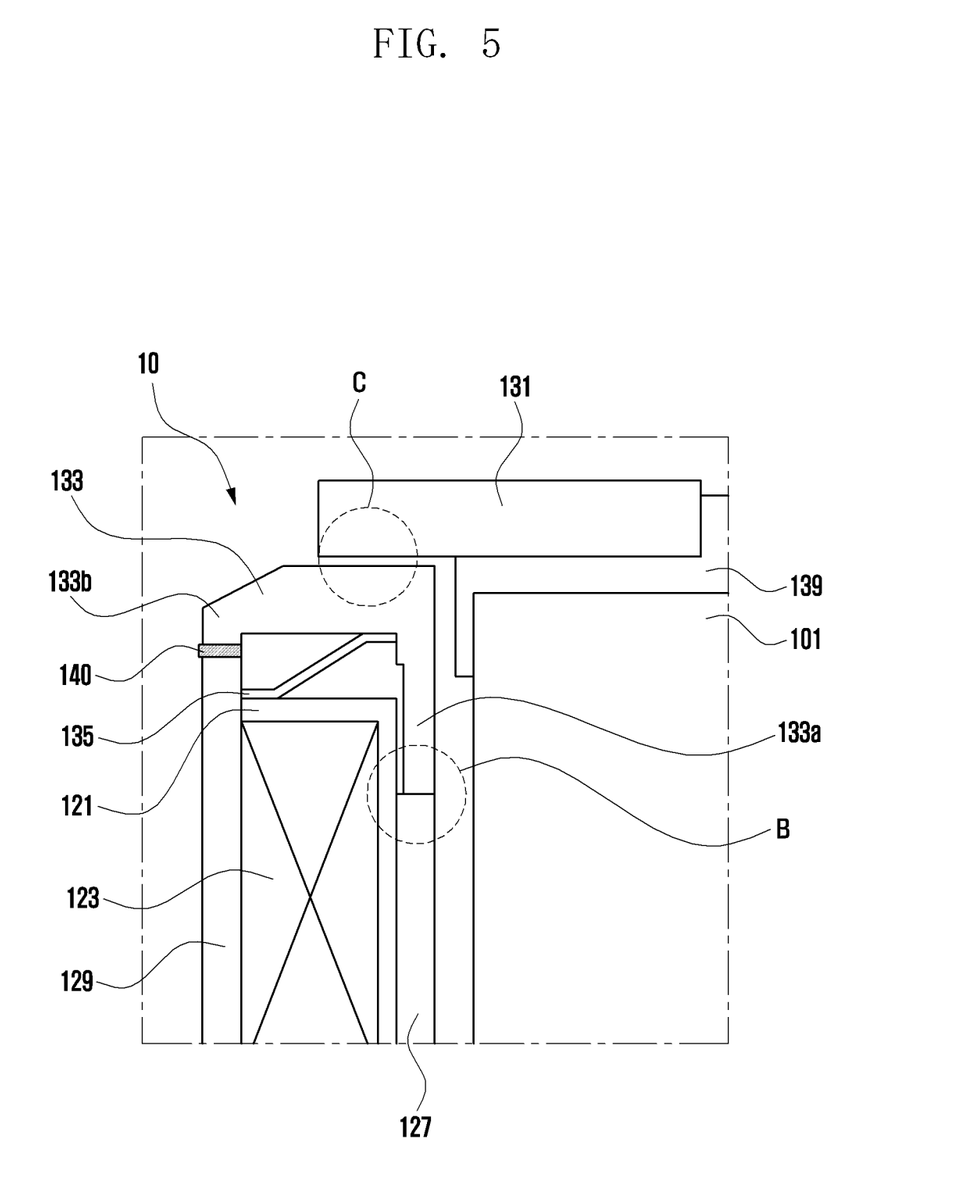
FIG. 5 is a view of a motor brake device including a buffer member according to still another embodiment of the disclosure.

FIG. 5 is a view of a motor brake device 10 including a buffer member 140 according to still another embodiment of the disclosure.

When the current is supplied to the solenoid module 120 to separate the second friction member 133 from the first friction member 131, a contact portion (indicated by B) between the one end portion 133a of the second friction member 133 and the inner ring 127 of the yoke may produce noise.

Therefore, as shown in FIG. 5, the buffer member 140 may be disposed in the gap (160, see FIG. 4). The buffer member 140 may absorb the kinetic energy of the second friction member 133 caused by the solenoid module 120 just before the one end of the second friction member 133 and the inner ring 127 of the yoke collide with each other. It is therefore possible to prevent the occurrence of noise.

Figure 6:
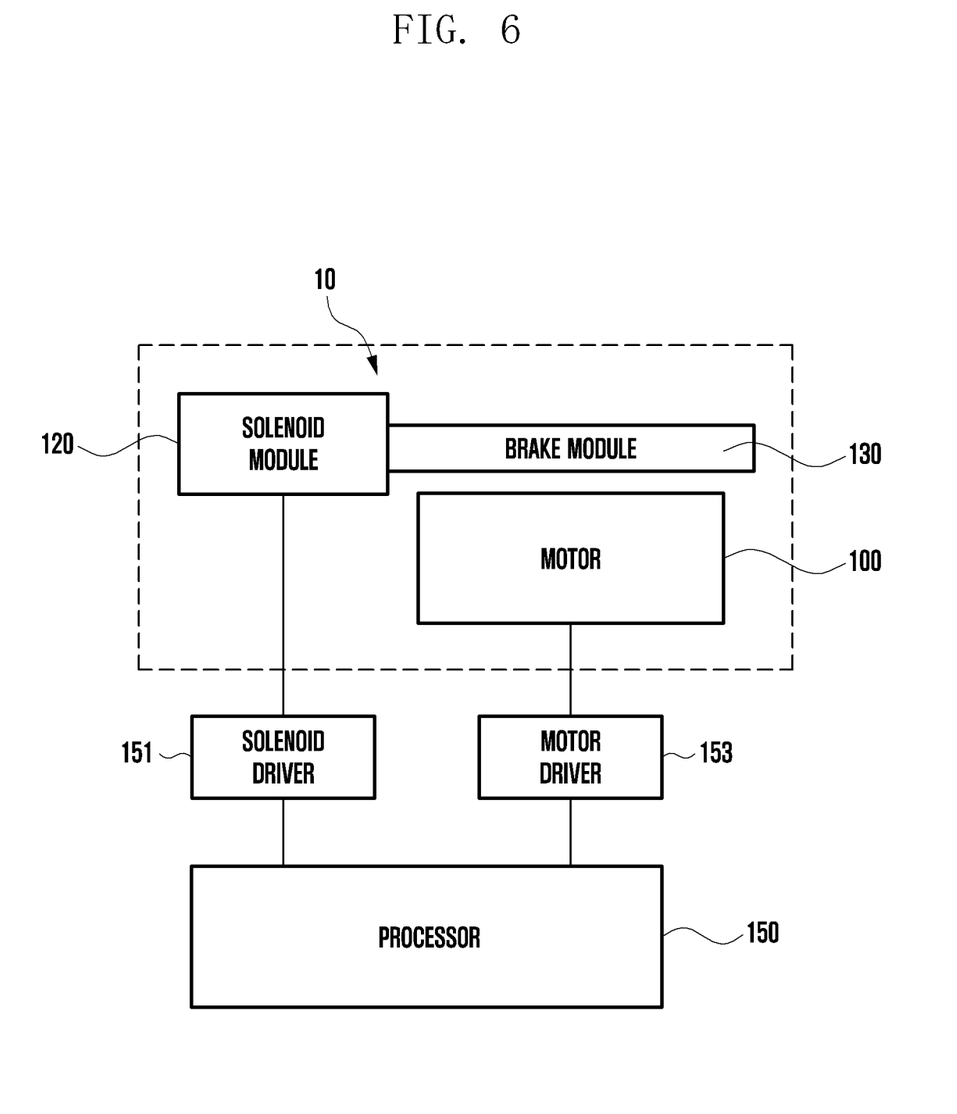
FIG. 6 is a block diagram of a motor brake device according to an embodiment of the disclosure.

FIG. 6 is a block diagram of a motor brake device 10 according to an embodiment of the disclosure.

A processor 150 according to an embodiment of the disclosure may perform an operation of receiving a signal of driving or stopping the motor 100, or perform an operation of supplying or interrupting a current to the motor 100 and the solenoid module 120 in order to drive or stop the motor 100 and the solenoid module 120. Specifically, the processor 150 may use a solenoid driver 151 to control the driving of the solenoid module 120, and may use a motor driver 153 to control the driving of the motor 100. The solenoid driver 151 or the motor driver 153 may be integrally formed with the solenoid module 120 or the motor 100, or may be integrally formed with the processor 150. The solenoid driver 151 or the motor driver 151 may be in the form of a separate integrated circuit or may be in the form of a program embedded in the processor 150.

The processor 150 may be a dedicated processor 150 (e.g., an embedded processor) for performing the above operations, or may be a general-purpose processor 150 (e.g., a CPU or an application processor) capable of performing the corresponding operations by executing one or more software programs stored in a memory device.

A motor brake device according to an embodiment of the disclosure may include a solenoid module disposed along a circumferential-direction outer peripheral surface of a motor; a first friction member combined with one surface of a rotor of the motor in a direction of a rotation axis of the motor; and a second friction member disposed along an outer peripheral surface of the rotor, moving by the solenoid module in the direction of the rotation axis of the motor by using the rotor as a movement axis, and thereby being in contact with or separated from the first friction member.

The solenoid module may include a bobbin disposed along the circumferential-direction outer peripheral surface of the rotor so as to form a gap with the rotor in a radial direction; a solenoid coil disposed along a circumferential-direction outer peripheral surface of the bobbin and providing an electromagnetic force in the direction of the rotation axis of the motor; and a yoke surrounding the bobbin and the solenoid coil.

The yoke may include an inner ring disposed between the rotor and the bobbin; and an outer ring surrounding the bobbin and the solenoid coil.

The length of the inner ring in the direction of the rotation axis may be smaller than the length of the outer ring in the direction of the rotation axis.

The motor brake device may further include an elastic member disposed between the second friction member and the bobbin so as to press the second friction member toward the first friction member.

When a current is applied to the solenoid module, the second friction member may be separated from the first friction member by the solenoid module.

The motor brake device may further include a buffer member disposed between the outer ring of the yoke and the second friction member.

The motor brake device may further include a third friction member disposed at a position where the first friction member and the second friction member are in contact with each other.

The first friction member and the rotor of the motor may be integrally formed with each other.

A motor brake device according to an embodiment of the disclosure may include a motor; a solenoid module disposed along a circumferential-direction outer peripheral surface of the motor; a first friction member combined with one surface of a rotor of the motor in a direction of a rotation axis of the motor; and a second friction member disposed along an outer peripheral surface of the rotor, moving by the solenoid module in the direction of the rotation axis of the motor by using the rotor as a movement axis, and thereby being in contact with or separated from the first friction member.

Figure 7:
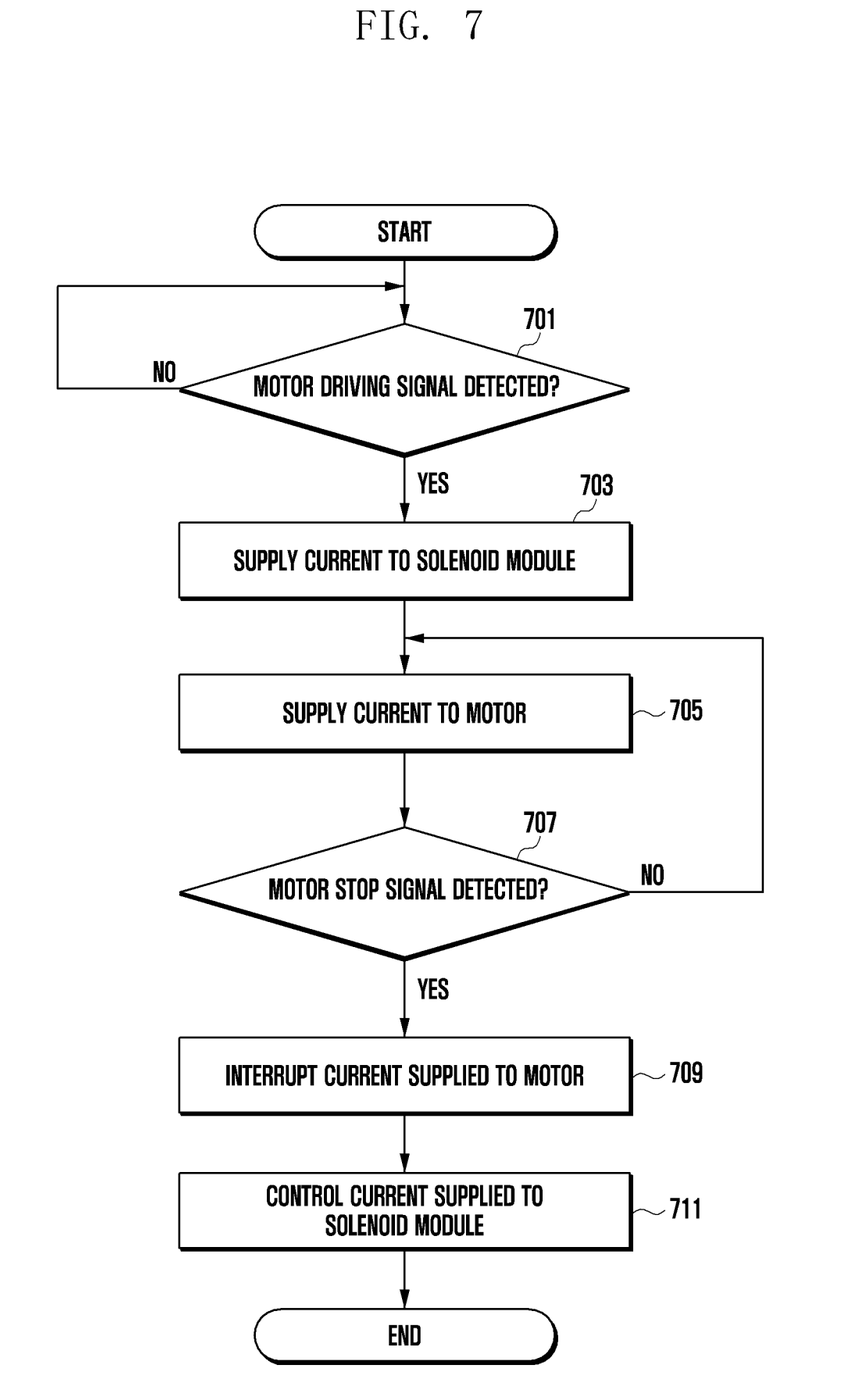
FIG. 7 is a flow diagram illustrating a control method of the motor brake device according to an embodiment of the disclosure.

FIG. 7 is a flow diagram illustrating a control method of the motor brake device according to an embodiment of the disclosure.

When the current supplied to the motor (100, see FIG. 2) and the solenoid module (120, see FIG. 2) is interrupted, the motor brake device according to an embodiment of the disclosure may be in a state where the rotor (101, see FIG. 2) is restricted by the brake module (130, see FIG. 2) as described above. Therefore, when a driving signal for the motor is detected at operation 701, there is a need to release the restriction of the rotor before driving the motor. Thus, the processor (150, see FIG. 6) may supply the current to the solenoid module at operation 703, and then supply the current to the motor at operation 705.

Thereafter, when a stop signal for the motor is detected at operation 707, the processor may interrupt the current supplied to the motor at operation 709 so as to stop the motor, and then interrupt the current supplied to the solenoid module at operation 711 so as to restrict the rotor by the brake module.

However, when the brake module restricts the rotor, noise may occur. Therefore, the control method of the motor brake device according to an embodiment may control the operation 711 of interrupting the current supplied to the solenoid module, thereby reducing the occurrence of noise. The details of control will be described below with reference to FIGS. 8A to 8D.

FIGS. 8A to 8D are graphs showing current control of a motor brake device according to various embodiments of the disclosure.

As shown in FIG. 5, when the second friction member 133 reciprocates using the solenoid module and the elastic member 135, noise may occur. Specifically, when the current supplied to the motor and the solenoid module is interrupted, and when the second friction member 133 is pressed toward the first friction member 131 through the elastic member 135, a portion (indicated by C) where the first friction member 131 and the second friction member 133 collides with each other may produce noise.

Therefore, the control method of the motor brake device according to various embodiments of the disclosure does not immediately interrupt the current supplied to the solenoid coil when interrupting the current supplied to the motor. Instead, the method interrupts the current supplied to the solenoid coil with a predetermined pattern, so that it is possible to reduce the noise occurring in the C portion.

Figure 8A:
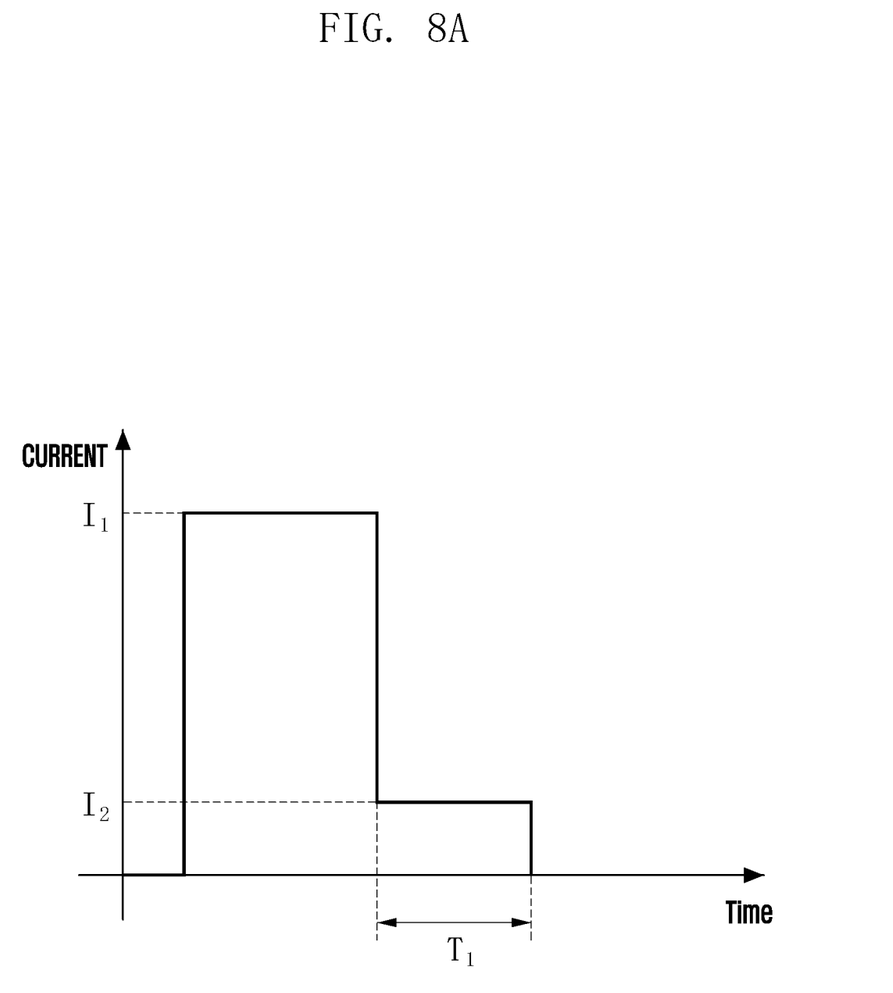
FIGS. 8A to 8D are graphs showing current control of a motor brake device according to various embodiments of the disclosure.

Now, referring to FIG. 8A, I1 denotes the intensity of a current supplied by the processor for driving the motor, and I2 denotes the intensity of a current at the moment that an electromagnetic force by the solenoid module becomes smaller than an elastic force of the elastic member. Also, T1 denotes a time required for the second friction member to be in contact with the first friction member when the electromagnetic force is applied by the solenoid module through which the current of I2 flows.

That is, even if the current supplied to the motor is interrupted, the current supplied to the solenoid module may be maintained for a certain time to reduce a moving speed of the second friction member and thereby reduce noise caused by impact.

Figure 8B:
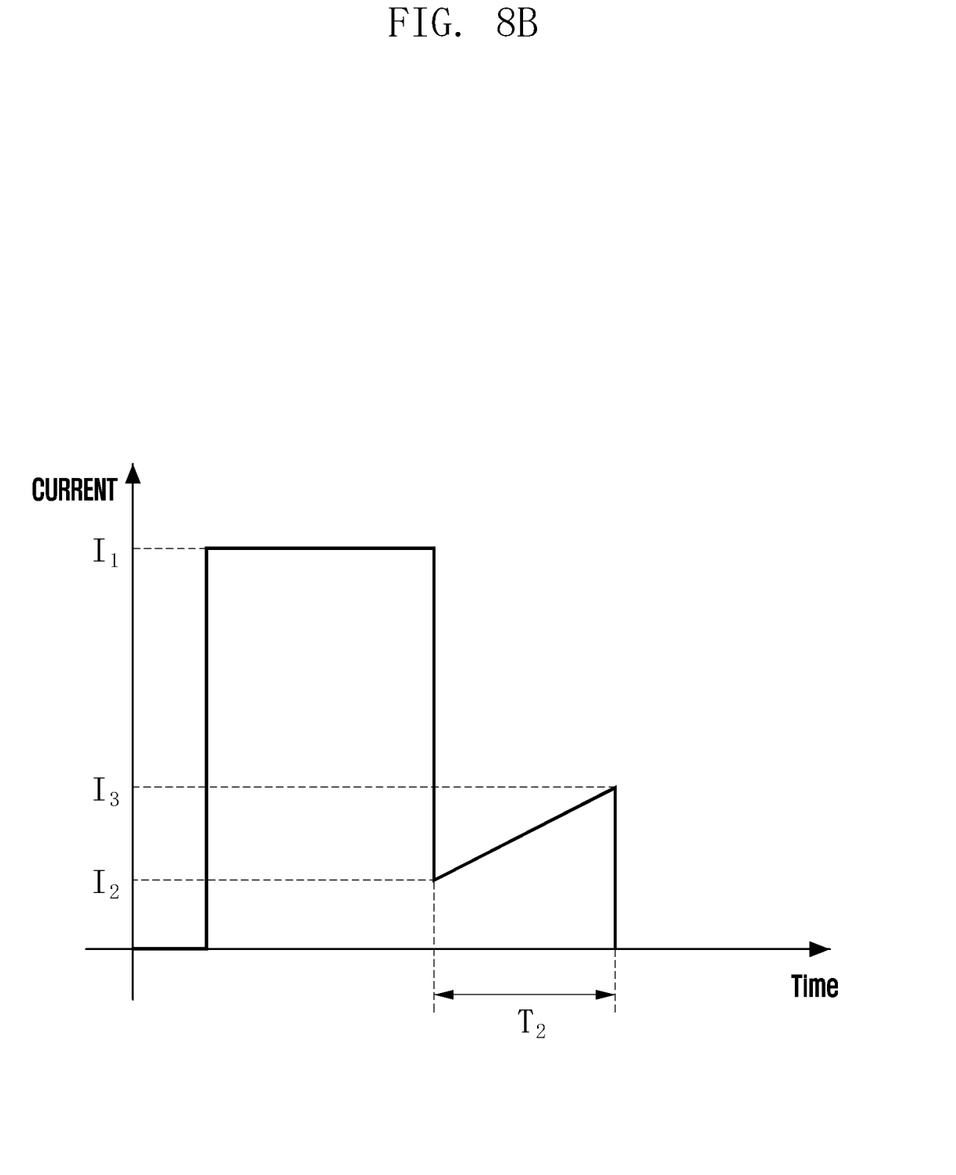

Referring to FIG. 8B, I1 denotes the intensity of a current supplied by the processor for driving the motor, and I2 denotes the intensity of a current at the moment that an electromagnetic force by the solenoid module becomes smaller than an elastic force of the elastic member. I3 is a certain value greater than I2. Also, T2 denotes a time required for the second friction member to be in contact with the first friction member.

The electromagnetic force applied to the second friction member by the solenoid module may be weakened as the second friction member moves away from the solenoid module. Therefore, in order to compensate for this, the current supplied to the solenoid coil may be linearly increased from I2 to I3 as the second friction member moves away. As a result, the moving speed of the second friction member is reduced, and thus the noise caused by the impact is reduced.

Figure 8C:
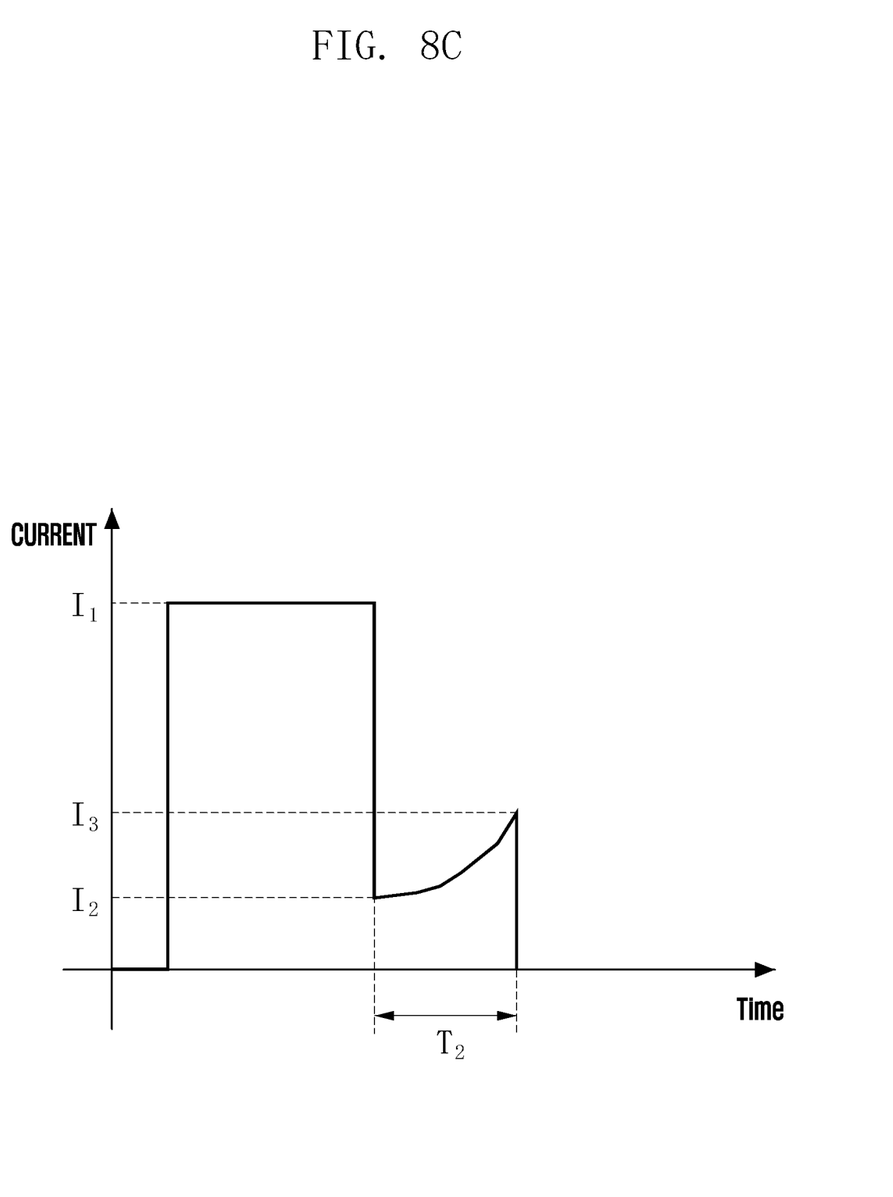

FIG. 8C shows another current supplying method for compensating for the electromagnetic force in comparison with FIG. 8B.

This method increases from I2 to I3 the current supplied to the solenoid coil along a quadratic function curve having an arbitrary constant rather than linearly increasing the current. This method can control more precisely the electromagnetic force applied to the second friction member, thus reducing the moving speed of the second friction member and also reducing the noise caused by the impact.

Figure 8D:
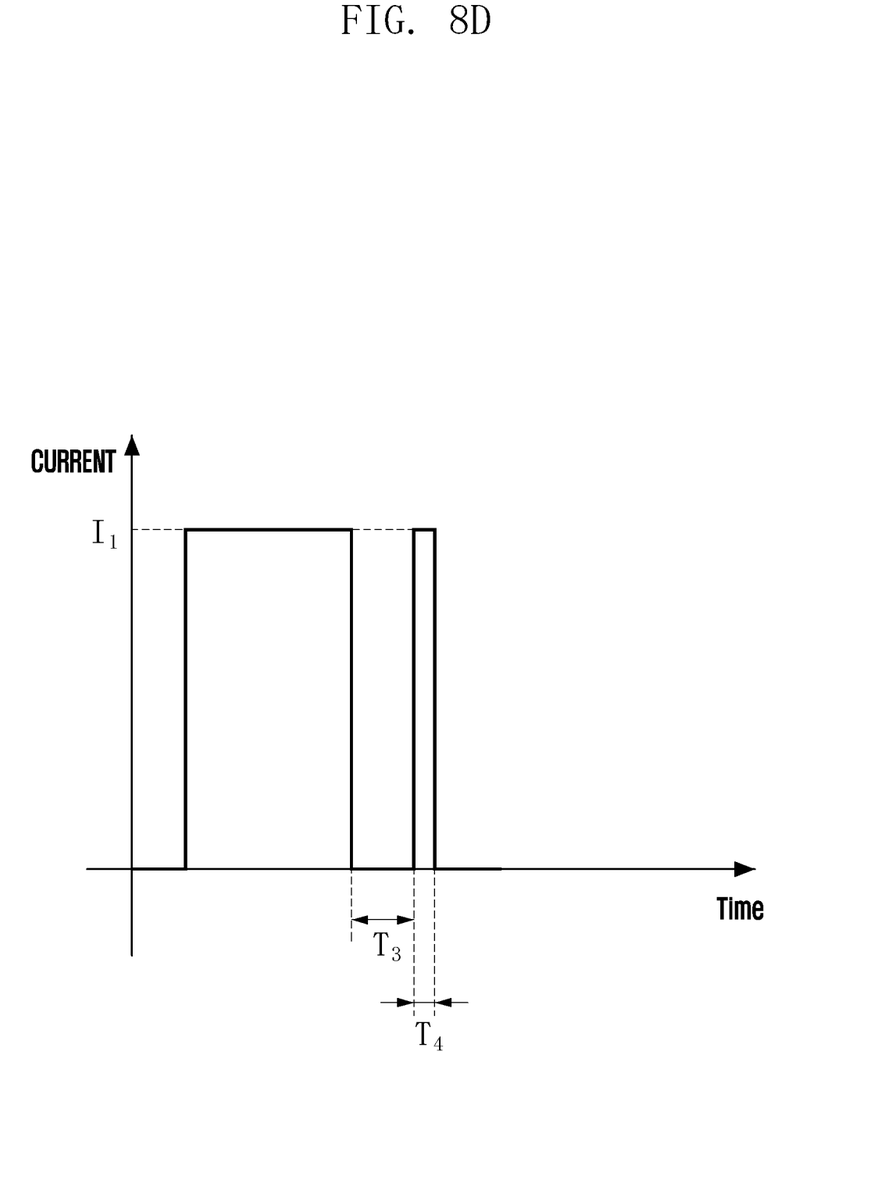

Referring to FIG. 8D, I1 denotes the intensity of a current supplied by the processor for driving the motor. T3 denotes a time until the second friction member collides with the first friction member when the current supplied to the solenoid module is interrupted. T4 denotes a time to supply the current of I1 after the elapse of the time of T3.

In this case, the current supplied to the motor and the solenoid module is interrupted. Then, the current of I1 is supplied for holding the second friction member immediately before the second friction member collides with the first friction member. Therefore, the moving speed of the second friction member can be lowered, and the noise caused by the impact can be reduced.

An electronic device according to various embodiments of the disclosure may include a motor; a solenoid module disposed along a circumferential-direction outer peripheral surface of the motor; a brake module including a first friction member combined with one surface of a rotor of the motor in a direction of a rotation axis of the motor, and a second friction member disposed along an outer peripheral surface of the rotor, moving by the solenoid module in the direction of the rotation axis of the motor by using the rotor as a movement axis, and thereby being in contact with or separated from the first friction member so as to restrict or permit a rotation of the rotor; and a processor configured to control operations of the motor and the solenoid module.

The processor may be further configured to detect an input of a driving signal for the motor, to supply a current to the solenoid module in response to the input of the driving signal for the motor so as to permit the rotation of the rotor by separating the second friction member from the first friction member, and to supply the current to the motor.

The processor may be further configured to detect an input of a stop signal for the motor, to interrupt the current supplied to the motor in response to the input of the stop signal for the motor, and to interrupt the current supplied to the solenoid module so as to restrict the rotation of the rotor by forcing the second friction member to be in contact with the first friction member.

The processor may be further configured to detect an input of a stop signal for the motor, to interrupt the current supplied to the motor in response to the input of the stop signal for the motor, and to interrupt the current supplied to the solenoid module after supplying the current to the solenoid module by a predetermined intensity I2 for a predetermine time T1.

The processor may be further configured to detect an input of a stop signal for the motor, to interrupt the current supplied to the motor in response to the input of the stop signal for the motor, and to interrupt the current supplied to the solenoid module after supplying the solenoid module with the current continuously varying from a predetermined intensity I2 to a predetermined intensity I3 for a predetermine time T2.

The processor may be further configured to detect an input of a stop signal for the motor, to interrupt the current supplied to the motor in response to the input of the stop signal for the motor, and to interrupt the current supplied to the solenoid module and then, after an elapse of a predetermined time T3, supply the solenoid module with a current having a predetermined intensity I1 for a predetermine time T4.

A control method of an electronic device including a motor and a brake module driven by a solenoid module according to an embodiment of the disclosure may include operations of receiving a signal related to an operation of the motor at a processor of the electronic device; when the received signal is a stop signal for the motor, interrupting a current supplied to the solenoid module so as for the brake module to restrict a rotation of the motor; and when the received signal is a driving signal for the motor, supplying the current to the solenoid module so as for the brake module to permit the rotation of the motor.

The operation of restricting the rotation of the motor by the brake module may include operations of supplying the current to the solenoid module by a predetermined intensity I2 for a predetermine time T1; and interrupting the current supplied to the solenoid module so as for the brake module to restrict the rotation of the motor.

The operation of restricting the rotation of the motor by the brake module may include operations of supplying the solenoid module with the current continuously varying from a predetermined intensity I2 to a predetermined intensity I3 for a predetermine time T2; and interrupting the current supplied to the solenoid module so as for the brake module to restrict the rotation of the motor.

The operation of restricting the rotation of the motor by the brake module may include operations of, after an elapse of a predetermined time T3, supplying the solenoid module with a current having a predetermined intensity I1 for a predetermine time T4; and interrupting the current supplied to the solenoid module so as for the brake module to restrict the rotation of the motor.

The invention claimed is:

1. A motor brake device comprising:
   a solenoid module disposed along a circumferential-direction outer peripheral surface of a rotor so as to be surrounding the rotor;
   a first friction member combined with one surface of the rotor of a motor in a direction of a rotation axis of the motor;
   a second friction member disposed along an outer peripheral surface of the rotor, moving by the solenoid module in the direction of the rotation axis of the motor by using the rotor as a movement axis, and thereby being in contact with or separated from the first friction member; and
   a yoke surrounding the solenoid module,
   wherein a length of an inner ring of the yoke is smaller than a length of an outer ring of the yoke, and
   wherein a length of a first end of the second friction member facing to the inner ring of the yoke is longer than a length of a second end of the second friction member facing to the outer ring of the yoke.

2. The motor brake device of claim 1, wherein the solenoid module includes:
   a bobbin disposed along the circumferential-direction outer peripheral surface of the rotor so as to form a gap with the rotor in a radial direction; and
   a solenoid coil disposed along a circumferential-direction outer peripheral surface of the bobbin and providing an electromagnetic force in the direction of the rotation axis of the motor,
   wherein the yoke surrounding the bobbin and the solenoid coil.

3. The motor brake device of claim 2, wherein the inner ring of the yoke is disposed between the rotor and the bobbin; and
   the outer ring of the yoke is surrounding the bobbin and the solenoid coil.

4. The motor brake device of claim 3, further comprising:
   a buffer member disposed between the outer ring of the yoke and the second friction member.

5. The motor brake device of claim 1, further comprising:
   a third friction member disposed at a position where the first friction member and the second friction member are in contact with each other.

6. An electronic device comprising:
   a motor including a rotor;
   a solenoid module disposed along a circumferential-direction outer peripheral surface of the rotor so as to be surrounding the rotor;
   a brake module including a first friction member combined with one surface of the rotor of the motor in a direction of a rotation axis of the motor, and a second friction member disposed along an outer peripheral surface of the rotor, moving by the solenoid module in the direction of the rotation axis of the motor by using the rotor as a movement axis, and thereby being in contact with or separated from the first friction member so as to restrict or permit a rotation of the rotor;
   a yoke surrounding the solenoid module; and
   a processor configured to control operations of the motor and the solenoid module,
   wherein a length of an inner ring of the yoke is smaller than a length of an outer ring of the yoke, and
   wherein a length of a first end of the second friction member facing to the inner ring of the yoke is longer than a length of a second end of the second friction member facing to the outer ring of the yoke.

7. The electronic device of claim 6, wherein the processor is further configured to:
   detect an input of a driving signal for the motor,
   supply a current to the solenoid module in response to the input of the driving signal for the motor so as to permit the rotation of the rotor by separating the second friction member from the first friction member, and
   supply the current to the motor.

8. The electronic device of claim 7, wherein the processor is further configured to:
   detect an input of a stop signal for the motor,
   interrupt the current supplied to the motor in response to the input of the stop signal for the motor, and
   interrupt the current supplied to the solenoid module so as to restrict the rotation of the rotor by forcing the second friction member to be in contact with the first friction member.

9. The electronic device of claim 7, wherein the processor is further configured to:
   detect an input of a stop signal for the motor,
   interrupt the current supplied to the motor in response to the input of the stop signal for the motor, and
   interrupt the current supplied to the solenoid module after supplying the current to the solenoid module by a predetermined intensity I2 for a predetermine time T1.

10. The electronic device of claim 7, wherein the processor is further configured to:
    detect an input of a stop signal for the motor,
    interrupt the current supplied to the motor in response to the input of the stop signal for the motor, and
    interrupt the current supplied to the solenoid module after supplying the solenoid module with the current continuously varying from a predetermined intensity I2 to a predetermined intensity I3 for a predetermine time T2.

11. The electronic device of claim 7, wherein the processor is further configured to:
    detect an input of a stop signal for the motor,
    interrupt the current supplied to the motor in response to the input of the stop signal for the motor, and
    interrupt the current supplied to the solenoid module and then, after an elapse of a predetermined time T3, supply the solenoid module with a current having a predetermined intensity I1 for a predetermine time T4.

12. A control method of an electronic device including a motor and a brake module driven by a solenoid module, the method comprising:
    receiving a signal related to an operation of the motor at a processor of the electronic device;

when the received signal is a stop signal for the motor, interrupting a current supplied to the solenoid module so as for the brake module to restrict a rotation of the motor; and when the received signal is a driving signal for the motor, supplying the current to the solenoid module so as for the brake module to permit the rotation of the motor, wherein restricting the rotation of the motor by the brake module includes:

supplying the current to the solenoid module by a predetermined intensity I2 for a predetermine time T1; and interrupting the current supplied to the solenoid module so as for the brake module to restrict the rotation of the motor.

13. A control method of an electronic device including a motor and a brake module driven by a solenoid module, the method comprising:

receiving a signal related to an operation of the motor at a processor of the electronic device;

when the received signal is a stop signal for the motor, interrupting a current supplied to the solenoid module so as for the brake module to restrict a rotation of the motor; and when the received signal is a driving signal for the motor, supplying the current to the solenoid module so as for the brake module to permit the rotation of the motor, wherein restricting the rotation of the motor by the brake module includes:

supplying the solenoid module with the current continuously varying from a predetermined intensity I2 to a predetermined intensity I3 for a predetermine time T2; and interrupting the current supplied to the solenoid module so as for the brake module to restrict the rotation of the motor.

14. A control method of an electronic device including a motor and a brake module driven by a solenoid module, the method comprising:

receiving a signal related to an operation of the motor at a processor of the electronic device;

when the received signal is a stop signal for the motor, interrupting a current supplied to the solenoid module so as for the brake module to restrict a rotation of the motor; and when the received signal is a driving signal for the motor, supplying the current to the solenoid module so as for the brake module to permit the rotation of the motor, wherein restricting the rotation of the motor by the brake module includes:

after an elapse of a predetermined time T3, supplying the solenoid module with a current having a predetermined intensity I1 for a predetermine time T4; and interrupting the current supplied to the solenoid module so as for the brake module to restrict the rotation of the motor.

* * * * *